United States Patent Office 3,060,010
Patented Oct. 23, 1962

3,060,010
CONTROL OF SUBMERGED AQUATIC WEEDS
Gustave Heinemann, Corpus Christi, Tex., assignor, by mesne assignments, to Pittsburgh Plate Glass Company
No Drawing. Filed Sept. 17, 1959, Ser. No. 840,528
8 Claims. (Cl. 71—2.1)

The present invention relates to the control of weed growth. More particularly, the present invention relates to the control of submerged, aquatic weeds normally occurring at the bottom of fresh water reservoirs, irrigation ditches, drainage ditches, and the like.

Fresh water ponds, irrigation ditches, and similar like receptacles of water having natural soil bottoms, while useful for water storage and transport are a constant source of trouble due to the occurrence on the bottom thereof of submerged, aquatic weed growth. Many industrial installations employ fresh water from such ponds for supply of fresh water to plant heat exchangers, boilers, and other similar equipment. The presence of any substantial growth of submerged aquatic weeds in ponds of this character seriously detracts from their usefulness since weeds are constantly breaking off and entering the plant water system, causing pump failures, plugged water lines, and other serious operation problems. Similarly, submerged aquatic weed growth in irrigation ditches, drainage ditches and other like waterways, causes fouling of lines, drains, and pumping equipment. Weed growth on waterway bottoms seriously interferes with normal water flow rates. Water weeds similarly deposit silt on the ponds and waterway bottoms making costly dredging operations often necessary.

Thus, it has been found that submerged aquatic weed growth may be effectively controlled by introducing into the soil on the bottom of a pond or waterway an alkaline earth metal oxide and/or hydroxide in a quantity sufficient to provide a soil having at least 1 percent by weight active alkaline earth metal oxide therein, preferably between 5 and 10 percent by weight. The alkaline earth metal oxide and/or hydroxide is thoroughly mixed with the soil bottom to provide a substantially uniform soil consistency along the entire surface of the bottom of the waterway and the alkaline earth metal oxide and/or hydroxide is mixed with the surface soil to a depth of at least 1 inch, preferably to a depth of between 3 and 9 inches. After the soil is treated with the alkaline earth metal oxide and/or hydroxide, the treated surface is preferably compacted prior to introducing water onto the conditioned surface.

The terms active alkaline earth metal oxide and active calcium oxide used herein in the specification and claims refer to the alkaline earth metal content of the treated soil which is present as either hydroxide or oxide and measured on a weight basis as an oxide. The terms exclude alkaline earth metal compounds present in soil as salts such as sulfates, nitrates, carbonates and the like.

In the practice of the present invention, various methods may be employed to accomplish the introduction of the alkaline earth metal oxides into the soil and the mixing of these oxides with the soil. Thus, in one embodiment, the alkaline earth metal oxide is conveniently spread on the surface of the waterway or pond bottom by manual or mechanical means and a suitable tilling device such as a mechanical tiller, a disc harrow, and other like equipment employed to work the alkaline earth metal oxide into the soil. In another embodiment, the alkaline earth metal oxide and/or hydroxide is conveniently mixed with soil in a mechanical mixer and the conditioned soil mixture so produced is spread on the bottom of the pond or waterway undergoing treatment. Any method of introduction and mixing may be employed that will efficiently provide an active alkaline earth metal oxide content in the soil above 1 percent by weight and to a depth of at least an inch.

Alkaline earth metal oxide and/or hydroxides employed may comprise the oxides and/or hydroxides of calcium, magnesium, barium and strontium and mixtures thereof. Calcium forms the preferred alkaline earth metal employed. In the preferred embodiment of the instant invention, calcium is worked into the soil as calcium hydroxide.

In this preferred method of soil conditioning and weed control treatment of a pond or waterway bottom, the body of water is first drained of its water. The bottom surface is then cleaned free of all weed growth and dried. To the surface of the cleaned bottom, calcium hydroxide is added usually by spraying the hydroxide over the surface soil. Preferably the milk of lime is added to the soil by attaching a spray to the mechanical equipment utilized to work the soil. In this manner, the soil is continuously mixed during the hydroxide addition and a more uniform distribution of the calcium hydroxide in the soil obtained. The hydroxide is worked into the soil to at least a one inch depth, but preferably the blades of the tiller or mixer employed to work the soil are adjusted to allow the soil to be worked and mixed with the hydroxide to depth of between 3 and 9 inches. The quantity of active calcium oxide present in the treated soil can be considerable and will be dictated by the quantity of soil to be treated, the cost and availability of the chemicals and other economic considerations. After the soil surface has been conditioned with the calcium hydroxide, the bottom is compacted by compression with hand tools or by utilizing a road grader, or other similar equipment. After compacting the soil, water may be introduced onto the treated surface and the waterway or pond put in use.

In similar fashion, calcium oxide in dry state may be added to the soil surface and worked or mixed into the soil to a depth of at least one inch but preferably to a depth of 3 to 9 inches below the soil surface. Enough calcium oxide is added to the soil to provide throughout the treated depth an active calcium oxide content of at least 1 percent by weight, preferably between 3 and 10 percent by weight, basis the weight of the soil. After the mixing, the soil is compacted and is ready for the introduction of water.

Ponds and waterways treated by the above-described methods present on their submerged surfaces an environment which is not receptive to weed growth. Typical of some of the weeds which are controlled in growth by their treatment are *Ceratophyllum demersum, Potomogeton interior, Potomogeton dubia, Potomogeton foliosus, Elodea canalensis, Heteranthera dubia, Typha latifolia, Juncaceae, Alismaceae* and other similar water weeds having root systems submerged in water.

For more complete understanding of the present invention, reference is made to the following example which illustrates one method of performing the described invention.

*Example*

A fresh water pond 500 feet long and approximately 200 feet wide was emptied of all water. The bottom of the pond was drained and all loose silt removed prior to the treatment. Upon completion of the removal of loose silt and weeds, the bottom of the pond was leveled with a road grader. A P. and H. Model EA-58 stabilizer manufactured by the Harnischfeger Corporation was then driven onto the pond bottom. The stabilizer was fitted with a plurality of spray nozzles positioned above the tilling blades and placed to spray liquid on the soil ahead of the blades. A supply of calcium hydroxide was connected to the spray nozzles through a hose and a pump utilized to deliver milk of lime from the supply source to the nozzles. During the treatment, 24,300 gallons of milk of lime were added to the soil and the soil churned and mixed during the addition. Upon completion of the mixing operation, the soil treated contained approximately 6 percent active calcium oxide, calculated on a dry basis by weight of the soil. The soil itself was worked to a depth of 6 inches during the operation. Upon completion of the mixing operation, a road grader was used to level the bottom of the pond and compact the treated area. Upon completion of the operation, the pond was filled with fresh water and observed over a period of 6 months. At the end of the 6-month period, the pond bottom was 80 percent weed free.

While the invention has been described with reference to a specific embodiment, it is not intended that the invention be so limited, except insofar as appears in the accompanying claims.

I claim:

1. A method of inhibiting submerged aquatic weed growth in waterways comprising adding a member of the group consisting of alkaline earth metal oxides, alkaline earth metal hydroxides, and mixtures thereof to the soil forming the waterway, mixing the soil and the added member to a depth of between about 3 and about 9 inches while providing in the mixture so obtained an active alkaline earth metal oxide content of at least 1 percent by weight and after mixing, compacting the treated soil by compression.

2. The method of claim 1 wherein the alkaline earth metal employed is calcium.

3. The method of claim 1 wherein the alkaline earth metal is calcium and said calcium is added as calcium hydroxide.

4. The method of claim 1 wherein the alkaline earth metal is calcium and said calcium is added as calcium oxide.

5. A method of inhibiting submerged aquatic weed growth in waterways comprising treating the soil forming the waterway with a member of the group consisting of alkaline earth metal oxides, alkaline earth metal hydroxides and mixtures thereof to provide an active alkaline earth metal oxide content in the treated soil of at least 1 percent by weight, said treated soil being between about 3 and 9 inches in depth and compressing the treated soil after treatment.

6. The method of claim 5 wherein the soil is treated with calcium hydroxide.

7. A method of inhibiting submerged aquatic weed growth in waterways comprising churning the soil utilized as the waterway to a depth of 6 inches, mixing into the churned soil calcium hydroxide in a quantity sufficient to provide about 6 percent by weight calcium oxide throughout the 6 inch depth of treated soil, compacting the treated soil by compression prior to its use as a waterway.

8. The method of claim 1 wherein the active alkaline earth metal oxide content is between 3 and 10 percent by weight.

References Cited in the file of this patent

UNITED STATES PATENTS

| | | |
|---|---|---|
| 1,222,253 | Young et al. | Apr. 10, 1917 |
| 2,958,595 | Pellegrini et al. | Nov. 1, 1960 |

OTHER REFERENCES

Wilson-Jones in "Herbage Abstracts," vol. 26, 1956, December 1956, pages 251–252.

Long: "Suppression of Weeds by Fertilizers and Chemicals," page 16, published March 1934.

Helgeson: "Method of Weed Control," pages 74 and 75, 1957.